United States Patent [19]

Francioni

[11] 4,180,951
[45] Jan. 1, 1980

[54] MASONRY WALL, METHOD FOR ITS PRODUCTION, AND ITS USE

[75] Inventor: Willi Francioni, Brugg, Switzerland

[73] Assignee: Gesellschaft zur Forderung der Forschung an der Eidg. Hochschule Techn., Zurich, Switzerland

[21] Appl. No.: 857,265

[22] Filed: Dec. 5, 1977

[30] Foreign Application Priority Data

Jul. 5, 1977 [CH] Switzerland .................. 8225/77

[51] Int. Cl.² .............................................. E04C 2/00
[52] U.S. Cl. ...................................... 52/100; 52/127;
52/249; 176/87
[58] Field of Search .................. 52/127, 100, 99, 249;
176/87; 264/32

[56] References Cited

U.S. PATENT DOCUMENTS

| | | | |
|---|---|---|---|
| 3,288,428 | 11/1966 | Terry ........................................ | 52/99 |
| 3,385,012 | 5/1968 | Lovegreen ......................... | 52/100 X |
| 3,844,075 | 10/1974 | Tolleson et al. ....................... | 52/127 |
| 3,979,866 | 9/1976 | Prescott ................................ | 52/249 |
| 4,061,534 | 12/1977 | Jackson ................................ | 176/87 |

*Primary Examiner*—J. Karl Bell
*Attorney, Agent, or Firm*—Lerner, David, Littenberg & Samuel

[57] ABSTRACT

A wall structure and a method for producing the wall structure. The wall structure is comprised of substantially standardized building elements which, one preferred embodiment, interlocks with adjacent elements along both the top and bottom and the vertical side surfaces. The surfaces of the building elements forming the interior and exterior surfaces of the finished wall are preferably reinforced along one such surface thereof. During the formation of the wall structure, horizontally and vertically aligned grooves are provided in the completed wall to facilitate the location at which severing should occur as well as to facilitate the severing of the reinforcing members to permit selected sections of the wall to be simply, readily and inexpensively removed. In one embodiment, the reinforcing members may be steel plates while in another alternative embodiment, the reinforcing members may be comprised of horizontally and vertically oriented elongated reinforcing rods. In embodiments where reinforcing elements are provided along the interior and exterior wall surfaces, anchor members may be employed for securing the reinforcing members along the interior surface to those along the exterior surface of the wall. Similar members may be employed to secure the reinforcing plates.

The individual building elements may either have smooth engaging surfaces or interlocking engaging surfaces.

The method of forming the wall comprises forming alternating building elements within the frame at spaced intervals therealong and then forming the remaining building elements at the regions between the previously formed building elements, said frame provided with means for defining the guide grooves along which enforcing members may be severed. Upon completion of the wall, the grooves may either be left uncovered, exposing the reinforcing members therein or alternatively they may be filled with construction material of lesser or weaker strength than the basic construction material, which is preferably concrete.

37 Claims, 9 Drawing Figures

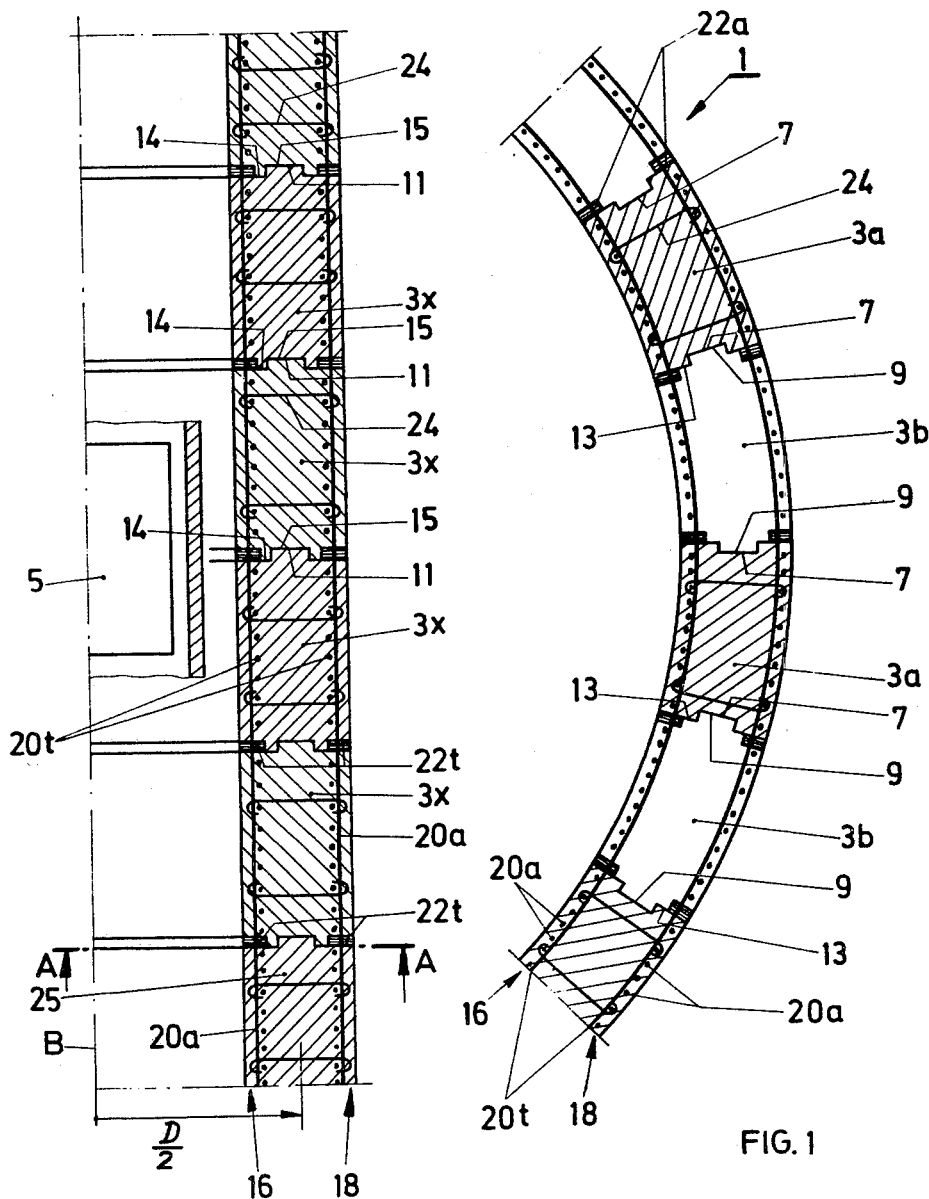

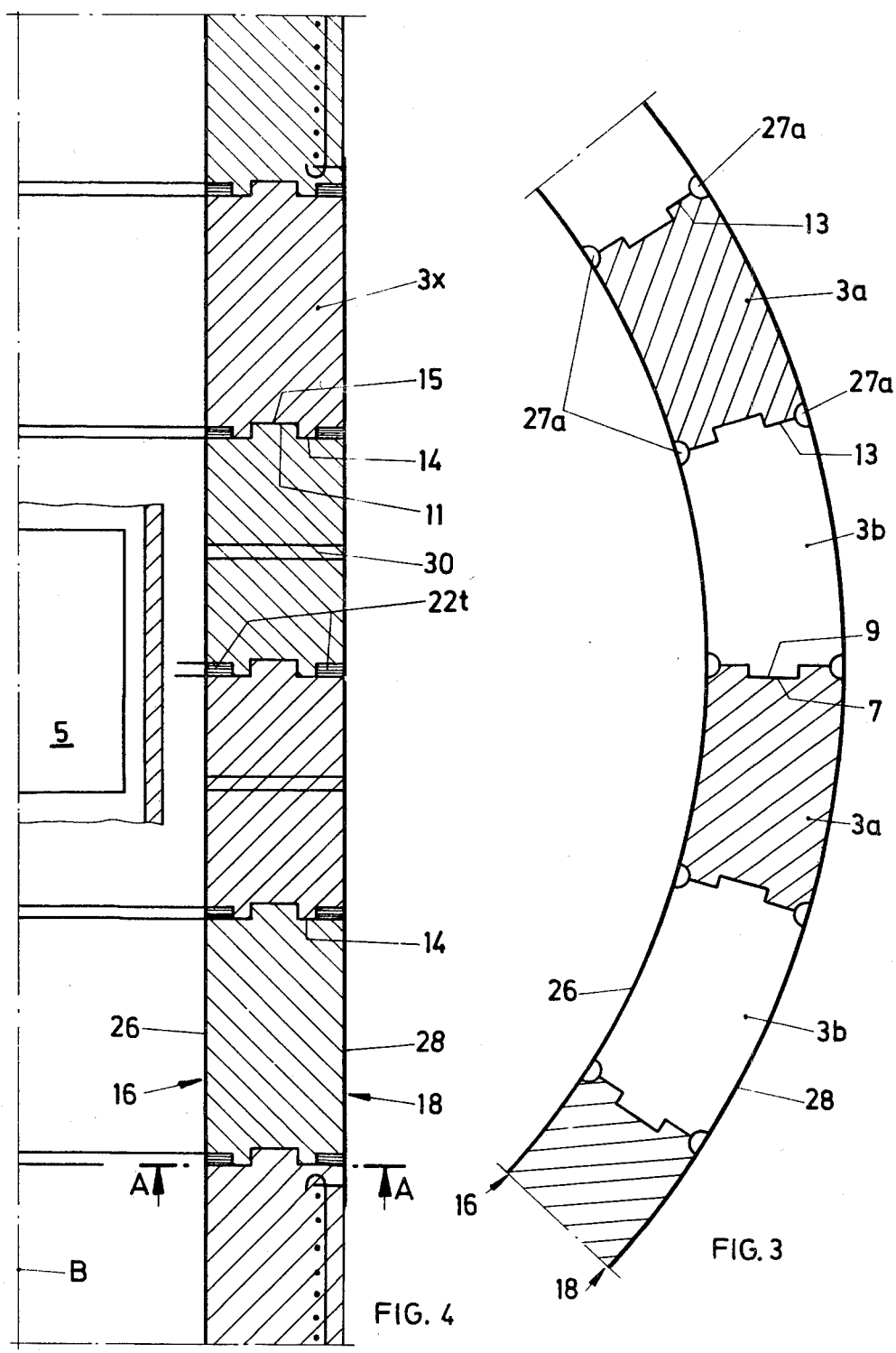

MASONRY WALL, METHOD FOR ITS PRODUCTION, AND ITS USE

BACKGROUND OF THE INVENTION

The present invention relates to a masonry wall, a method for its production, and its use.

Boiling water and pressurized water reactors, particularly in more recent installations, employ a one-piece heavily reinforced biological shield which is activated by the neutron flux.

At least a part of the biological shield is activated by the neutrons which are discharged from the reactor core. In more modern designs of pressurized water reactors the reactor core is surrounded directly by an inner, cupshaped shielding trough spaced from the core, which in turn is additionally enclosed by an outer shield which also acts as suspension for the pressure vessel with the reactor core. Cooling air is pumped through the spaces between the outer and inner biological shield on the one hand and between the inner shield and the reactor on the other. The inner as well as the outer biological shield is activated most in those areas in the reactor core level, the former practically over its entire thickness and the latter more or less deeply into its inner wall.

In boiling water reactors, too, the biological shield surrounding and coaxial with the reactor core or the pressure vessel is activated most in the core area whereas the outer reactor wall (drywell wall) is virtually not activated.

As must be expected, nuclear power plants must be disassembled after their life span or "deworried" in technical terminology. Under certain circumstances, this also includes tearing down parts of buildings, in particular also the dismantling of the shields, a pair of which is radioactive, as already mentioned. They must be treated as radioactive waste, i.e., they must be transferred to an intermediate or an ultimate storage place for radioactive waste, depending on the "deworrying" concept. The remainder of the shield could basically be treated like nonradioactive waste, which so far, however viewed from the practical side, was meaningless from a reusable view point because the shield was of one-piece construction and could not, or only at great expense, be broken up into radioactive and nonradioactive zones.

OBJECTS AND BRIEF DESCRIPTION OF THE INVENTION

It is an object of the present invention to eliminate the above disadvantage through the provision of a masonry wall which permits its breakup into portions to be treated differently at but little expense.

For this purpose, the masonry wall according to the invention is characterized in that it comprises at least nearly blockshaped building elements lying on top and next to each other and at least nearly in mutual alignment to form a wall so that at least nearly uninterrupted bearing and contact surfaces are created, and in that there are disposed, in the area of both outside surfaces of the wall, mounting supports anchored in at least a number of the elements for their mutual support, that the mounting supports are further designed so as to be accesible and separable along lines running at least nearly parallel to at least some of the bearing and contact surfaces of the elements to make possible the removal of masonry portions by the selective separation of the elements along such lines by lifting them from their bearing surface or pulling them along their contact surfaces, the mounting supports being convered up at the most by covering material along the sever lines.

BRIEF DESCRIPTION OF THE FIGURES

The invention will be explained below by way of example with reference to the Figures in which:

FIG. 1 shows a cross-sectional segment of a masonry wall for the biological shield of a boiling water reactor with reinforcements as mounting supports;

FIG. 2 a longitudinal section of a masonry wall according to FIG. 1;

FIG. 3 a cross-sectional segment of a masonry wall for the biological shield of a boiling water reactor with sheet metal parts as mounting supports;

FIG. 4 a longitudinal section of a masonry wall according to FIG. 3;

DETAILED DESCRIPTION OF THE INVENTION AND THE PREFERRED EMBODIMENTS THEREOF

Figure 6:
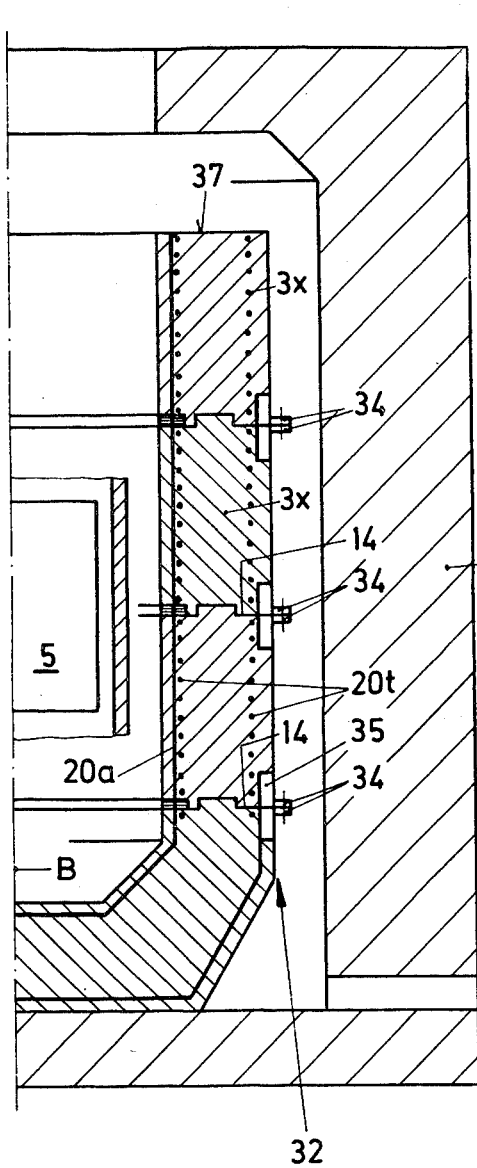
FIG. 6 a longitudinal section of the shielding arrangement according to FIG. 5.

According to FIGS. 1 and 2, a finished wall comprises a multiplicity of building elements 3 lying on top of and next to each other. The building elements 3 are basically block-shaped and, in the application example per FIG. 1. and 2, are curved to form arcuate segments for the biological shield to conform to its cylindrical shape relative to the axis B of a reactor core 5 and according to the cylinder diameter D. It should be noted that different diameters D were selected in FIGS. 1 and 2 for graphic reasons.

It may be seen in FIG. 1 how the building elements 3 are joined to each other laterally. The building elements are of two basic element shapes 3a and 3b which are differentiated from one another by their differently designed narrow sides. The narrow sides of building elements 3a each have one groove 7 extending over the entire height of the building element, whereas the building elements 3b have a corresponding tongue 9 on both their narrow sides. By insertion of the tongues 9 in the grooves 7 the building elements 3 are joined radially along their contact surfaces 13.

It may be seen from FIG. 2 that each building element 3 has on its top side, intended for the support of the next building element on top of it, a tongue 11 extending over the entire length of the building element, and on its bottom side a corresponding groove 15 which is engaged by the tongue 11 of the next lower building element when another one is placed on top of it. The elements 3 are thus also joined radially along their bearing surfaces.

In this application, the contact surfaces 13 extend axially in this mode of construction, the bearing surfaces being coaxial circular areas. Between two contact surfaces 13 wall segments are formed according to the arcuate length of the building elements placed on top of each other, and between two bearing surfaces 14 are formed wall courses determined by the height of the building elements. If the walls are planar, analogous segments and courses result. The building elements 3 are preferably made of concrete or another solid building material, depending on the application. They are not mutually joined by material at their planes of contact 13,14.

Without going into the production method of such walls for the time being, it is evident from FIGS. 1 and 2 that reinforcing elements are disposed at the outer wall areas 16 and 18 in the building elements 3, i.e. at the inner and outer cylinder surface. The one group of reinforcing elements 20a extend at least nearly parallel to the contact surfaces 13, while the other group 20t are arranged parallel to the bearing surfaces 14.

The reinforcing elements 20a and 20t thus form a preferably regular, rectangular grid on both outside wall areas 16 and 18.

As already noted above, the reinforcing elements 20a are embedded in the material of the building elements 3, thereby joining them to form a solid masonry wall.

Grooves 22t are formed directly alongside the contact surfaces over their entire length at both areas 16,18 by corresponding longitudinal recesses in the building elements 3.

These grooves 22t are deep enough for the axial reinforcing elements 20a to be accessible in them. Preferably, no tangential or lengthwise reinforcing elements 20t are disposed in the grooves 22t.

Now, from the arrangement of the grooves 22t alongside the bearing surfaces 14, it is evident that a masonry ring corresponding to the axial height from the crown of the masonry wall to the line of separation can be lifted off by cutting the axial reinforcing elements 20a going through said grooves 22t in one groove each of each outside wall area 16 and 18. Axially directed grooves 22a are formed directly along the whole contact surfaces 13, down to a foundation course 25. These grooves are deep enough for the tangential or lengthwise reinforcing elements 20t to be accessible in them. Here too, preferably no axial reinforcing elements 20a are disposed in these grooves 22a. The axially directed grooves are formed at both areas 16, 18 by corresponding recesses in the building elements 3, so that by cutting the tangential or lengthwise reinforcing elements 20t in two axial grooves 20a on both areas 16, 18 a segment of the masonry according to the distance between the two pair of grooves used for cutting can be pulled up in axial direction.

Due to the possibility of selectively cutting the reinforcing elements 20a,t at the respective contact area 13,14 of the building elements 3 it is possible to remove purposefully larger or smaller masonry segments of a given axial size or height and to remove the contaminated parts of the biological shield at a significantly reduced coast, especially when compared to conventional techniques.

Coming back to the section shown in FIG. 1 it is clear that all the building elements 3 can also be of identical design with respect to their contact surfaces 13, analogous to their bearing surfaces. This would mean that each building element would have to have at its side surfaces a tongue 9 and a groove 7 respectively.

In certain applications requiring the absorption of smaller radial forces and/or the guarantee of smaller safety factors it can immediately be envisioned to design the contact and bearing surfaces of the building elements without tongues 9,11 and grooves 7,16, i.e., with smooth faces, top and bottom sides. Such a design has the advantage that not only whole segments can be loosened and then removed parallel to the contact surfaces or complete courses parallel to the bearing surfaces, but that pieces of masonry can be loosened by cutting the appropriate reinforcing elements along outlines closed within themselves and then pushed out of the masonry wall by applying pressure against one of the two outside wall areas. The same result may be accomplished in the embodiment of FIGS. 1 and 2 by cutting grooves 22a and 22t to extend to the tongues 9 and 11, so that two respective, preferably filled grooves 22a, 22t as will be described, form the grooves 7,15 therebetween, for the mentioned tongues.

It is evident from FIG. 2 that the stability of the masonry wall can be increased, in particular for lifting off loosened portions, by radial anchors 24 which interconnect positively the reinforcements of the two outside wall areas 16 and 18. The reinforcing elements and the anchors are preferably made of structural steel, other materials such as certain plastics offering themselves for certain applications as well.

Furthermore, the grooves 22t and 22a are preferably filled with a lean concrete or another relatively soft or brittle material to make the cutting points invisible from the outside, which may be advantageous for esthetic, but possibly in certain applications for safety reasons.

The masonry wall is completed in the following steps, whereby another solid building material can be used instead of concrete:

After an inner and an outer form has been erected and the reinforcing elements, possibly with the transverse anchors, have been built in, a first foundation course such as the one marked 25 in FIG. 2 is poured in concrete.

After the form is removed from it, the first bearing surface 14, such as according to line A—A is framed and poured.

To prevent it from clinging to other poured concrete layers, this bearing surface is provided with a separating film in the form of a coat of paint such as Inerthol.

Thereupon a tangential or length groove 22t each is framed in accordance with the two outside wall areas and filled with lean concrete or another, relatively soft or brittle material, or the recesses corresponding to the groove are prepared by insertion of a recessing element.

Thereupon every other building element, i.e., each element 3a having no axial groove recesses is framed vertically and poured in concrete.

After setting and removal of the frame their faces are covered with an adhesion preventing coating such as of Inerthol, whereupon the four adjacent axial grooves 22a are framed and filled with lean concrete or the like, or else their recessing elements are inserted.

The intermediate elements 3b are poured in concrete.

This completes a first course or length strip of the masonry wall upon the foundation course. The second bearing surface is now treated analogous to the first one and so on, course by course, adding one to the other. In certain applications, when transverse anchors 24 are provided, the reinforcing elements 20a, 20t need not be embedded in concrete, but may be exposed freely at the outside wall areas. This obviates the need for grooves, making it possible to use prefabricated building elements as building elements 3, through which transverse anchors 24 can be stuck later through appropriate holes for fastening on both sides to the external reinforcing grids.

FIGS. 3 and 4 show a masonry wall analogous to FIGS. 1 and 2 in which the mounting supports are formed not by reinforcing elements, but by steel sheets 26 and 28 at the outside wall areas 16 and 18. Here again, the building elements 3 are categorized into 3a and 3b with respect to the design of their contact surfaces 13. As mentioned above, identical building elements as regards the distribution of tongues 9 and grooves 7 may likewise be provided here. To assure that the two steel sheets 26 and 28 can be separated along the contact or bearing surfaces 13 or 14, respectively, grooves 22t are disposed along both sides of the bearing surfaces 14 in a manner analogous to that shown in FIG. 2. These grooves 22t may likewise be filled with lean concrete or the like, or they may be left empty to make it possible to cut the steel sheets along these grooves 22t such as by means of flame cutters with the least possible heat dissipation.

The axial grooves 27a are designed slightly different from those in FIG. 1. They are not only formed in the building elements 3b as in FIG. 1, which is preferable, as is apparent from the manufacturing method, when the grooves are filled with lean concrete or the like, but they are formed in channel shape and are symmetrical relative to the contact surfaces 13 by concaving the respective edges of both adjacent building elements 3a, 3b. These grooves 27a are not filled in. Grooves like those designated 22a in FIG. 1 may, however, also be used in conjunction with steel sheets.

If neither the grooves 22a nor 27a are filled with material, this construction variation is excellently suited for use in prefabricated building elements.

To strengthen the masonry wall, transverse anchors 30 are led from steel sheet to steel sheet and firmly joined to them.

The method described above with regard to FIGS. 1 and 2 can also be used in this embodiment variation, the steel sheets serving as inner and outer frame.

If appropriate holes are provided in the prefabricated building elements possibly used, the anchors can also be inserted subsequently in the latter and joined to the steel sheets.

In this masonry wall, too, the outside mounting supports, formed by the two steel sheets 26 and 28 in this case, can be cut without difficulty from the outside so that here, too, wall segments and/or courses can be pulled out or lifted off as explained above.

It goes without saying that building elements without grooves 7, 15 and tongues 9, 11 can be used in this embodiment also, i.e., building elements with smooth facing top and bottom sides, provided each building element is preferably equipped with a transverse anchor 30.

Figure 8:
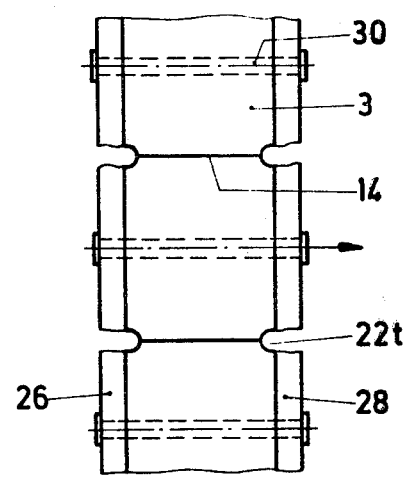
FIG. 8 a longitudinal part section of an embodiment with smooth masonry building elements according to FIG. 4, the direction in which to push out a separated masonry wall portion being indicated.

As shown in FIG. 8 it becomes possible to pull out of the masonry wall any portion cut all around.

As is known, in contrast to boiling water reactors, the biological shield of pressurized water reactors comprises an inner and an outer coaxial ring. As is evident from FIGS. 5 and 6, the outer ring is formed by a building wall 31 surrounding both the reactor core 5 and the inner shield 32 which is coaxial to the reactor axis B.

Analogous to the embodiments of FIGS. 1 to 4 for boiling water reactors, the inner shield 32, radioactivated in particular, consists of a cylindrical wall directly surrounding the reactor core. However, differing from the above described embodiments, accessibility to the outer exterior wall area 18 of the inner shield 32 is not assured off-hand due to the outer shield 31. At least it is not accessible radially so that mounting supports must be provided which are accessible and separable from the axial direction. But since the manufacture and installation of such mounting supports to be described hereinbelow is more expensive than that of metal sheets or reinforcing elements, they are preferably disposed only on the side of the inner shield 32 which faces the outer shield 31, although such mounting supports may also be disposed on both sides of this shield 32.

It is clear that the mentioned lack of accessibility interferes particularly with the cutting of those mounting supports which hold the building elements 3 together in the axial direction and they must therefore be cut along or at least more or less parallel to the bearing surfaces 14 of the building elements. The mounting supports assuring tangential adhesion or adhesion transverse to the contact surfaces 13 can be cut, at least in the area of the masonry wall crown 37, through axial grooves 22a provided analogous to the example of FIG. 1.

Regarding the inner outside wall area 16, the design of the inner shield 32 is the same as that of the embodiment of FIGS. 1 and 2, but could, of course, also be analogous to FIGS. 3 and 4. Also analogous to FIG. 1 tangential or longitudinal reinforcing elements 20t are provided at the outer wall area 18 of said shield 32, preferably parallel to the bearing surfaces 14.

Figure 5:
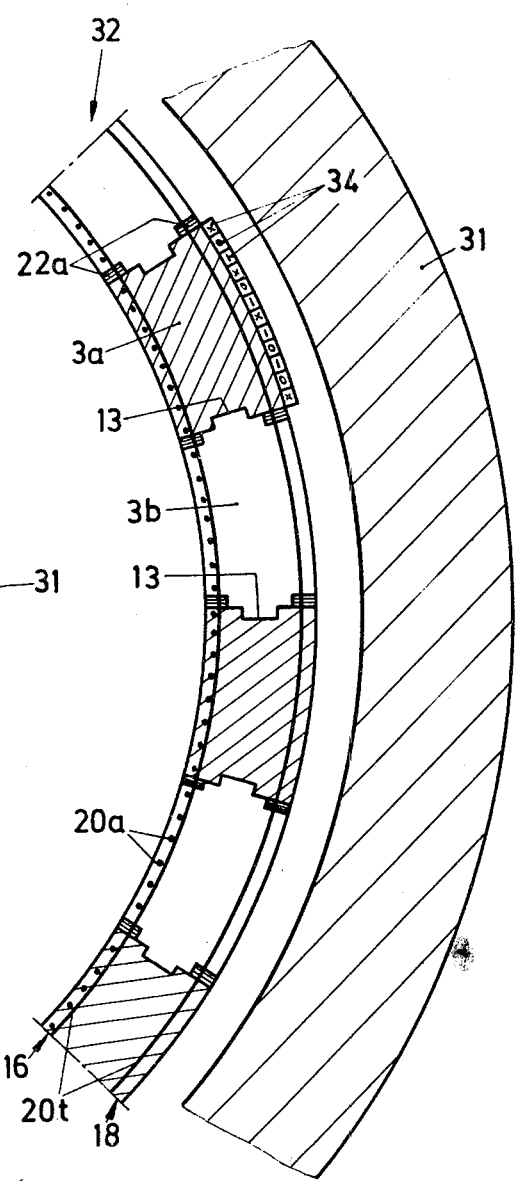
FIG. 5 a cross-sectional segment of a masonry wall for the biological inner shield of a pressurized water reactor and the building wall acting as outer shield.
Figure 9:
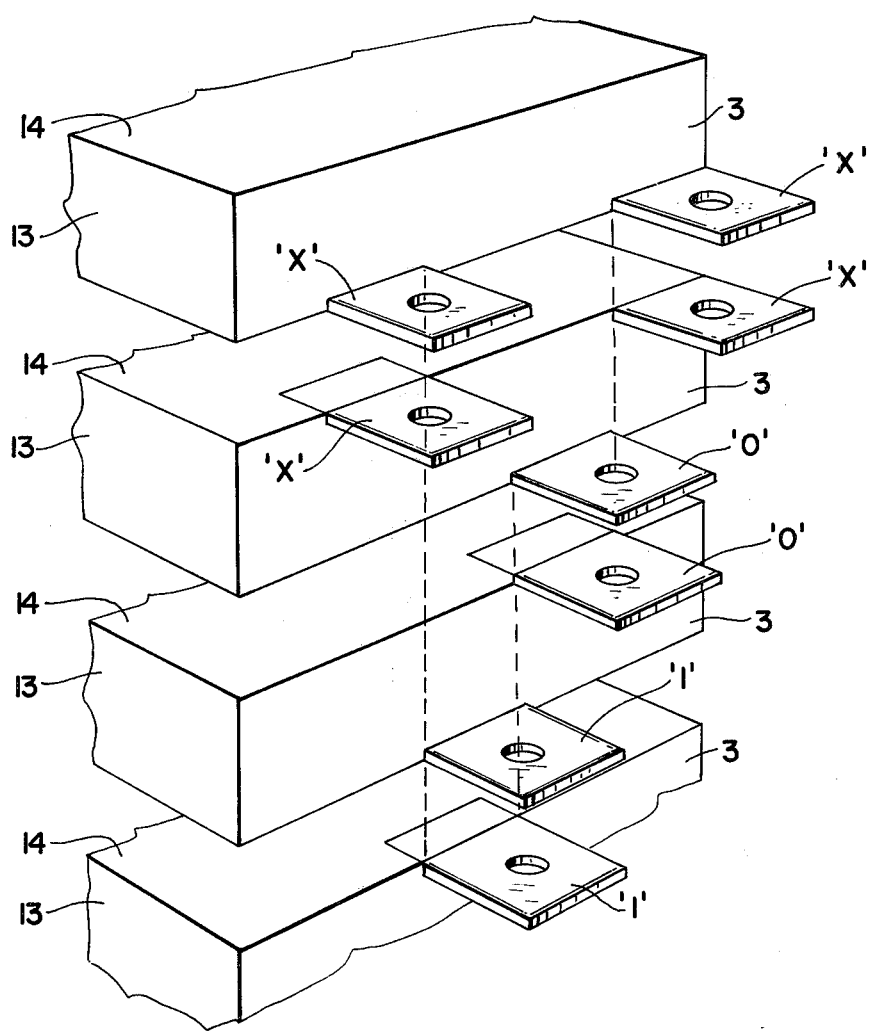
FIG. 9 an enlarged perspective view of the fishplate-arrangement according to FIG. 5.

Now, since in contrast to the embodiment example of FIG. 1 and 2, no axial reinforcing elements 20a can be embedded in the outside wall area 18 of the embodiment according to FIGS. 5,6 because they could not be cut, the adhesion of the individual ringshaped courses parallel to the bearing surfaces 14 is assured in that, as seen in particular from FIG. 9, fishplates 34, projecting outwardly and axially aligned in pairs such as by screwing them together from the top, are disposed along said surfaces 14 of both the building elements serving as bearing surfaces and the ones placed on top of them. It must be made sure, however, that the fishplates 34 or the screws of each bearing surface 14 are accessible from the top and do not cover each other up axially. As shown in FIG. 5, this is accomplished in that the fishplates of the various bearing surfaces 14 are staggered tangentially. In FIG. 5, and FIG. 9 the fishplates designated "X" are associated with a first bearing surface, those designated "0" with a second one and those designated "1" with a third bearing surface 14 so that this tangential staggering makes all of them accessible axially.

To increase the strength inherent in the individual building elements 3 in the radial direction, it presents no problem to reinforce the latter separately in the axial direction also.

To erect the masonry wall shown in FIGS. 5 and 6 the procedure is analogous to that described above, the fishplates 34 with their anchors 35 being embedded in the solid building material as concrete or, if prefabricated building elements can be used, attached to the latter during prefabrication.

Figure 7:
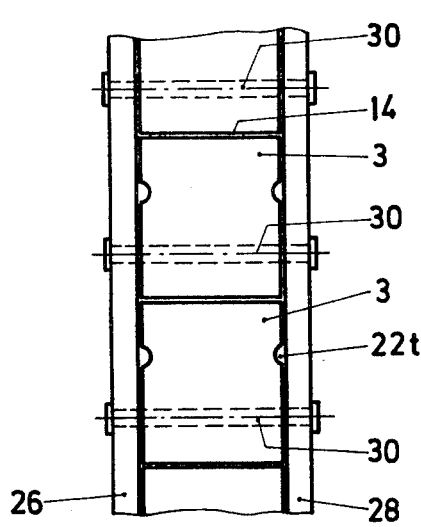
FIG. 7 a longitudinal part section of another embodiment of the masonry wall according to FIG. 4.

In this example the masonry wall is broken down either by lifting off individual courses or strips and cutting these rings up subsequently, or by cutting the tangential reinforcing elements 20t axially in building element increments from the crown of the wall and pulling masonry sectors out in building element increments. It must further be noted that when transverse anchors 30 are provided, the tangential grooves 22t may be disposed not along the bearing surfaces 14 but, as sketched in FIG. 7 for plane building elements 3, also between these surfaces, particularly if metal sheets 26,28 are used as mounting supports. The axial grooves may also be staggered.

This groove arrangement is particularly well suited for the use of prefabricated building elements and has the advantage that the sheet metal edges of the wall parts left standing and/or to be replaced serve as positioning guides when refitting masonry wall parts.

The masonry wall described makes it possible to remove without much expense the activated portion of the biological shields of nuclear power plants and to treat the remaining masonry wall as nonactivated waste. The masonry wall described may also be intended for other applications where it is important to remove portions selectively at any time and at relatively low cost.

Although the invention has been described with respect to its preferred embodiments, it should be understood that many variations and modifications will now be obvious to those who are skilled in the art and it preferred, therefore, that the scope of the invention be limited, not by the specific disclosure herein, but by the appended claims.

What is claimed is:

1. A masonry wall comprising a plurality of building elements which are arranged in rows and columns and reinforcement means for joining each of a selected number of said elements to its adjacent elements and for reinforcing said wall, said reinforcement means being arranged with respect to said selected number of said elements so as to be accessible and severable from the exterior of said wall at predetermined portions thereof, said predetermined portions being arranged so that each element of said selected number of said elements is selectively removable from said wall, either individually or as part of a selected group of said elements.

2. A masonry wall according to claim 1, wherein said elements are generally block-shaped.

3. A masonry wall according to claim 2, wherein each adjacent pair of said elements has cooperating tongues and grooves for removably attaching each of said elements to its adjacent elements.

4. A masonry wall according to claim 2, wherein each of said elements has a groove in one of its top and bottom faces and a tongue on the other of its top and bottom faces, the tongues and grooves of adjacent elements cooperating so as to removably attach each of said elements to upper and lower adjacent elements.

5. A masonry wall according to claim 2, wherein said reinforcement means is positioned adjacent to at least one of two opposite exterior surfaces of said wall.

6. A masonry wall according to claim 5, further comprising a plurality of connectors, each of said connectors being attached to said reinforcement means adjacent to one of the exterior surfaces of said wall and to at least one of said elements.

7. A masonry wall according to claim 5, further comprising a plurality of connectors, each of said connectors being attached to said reinforcement means adjacent one of the exterior surfaces of said wall and to said reinforcement means adjacent to the other exterior surface of said wall.

8. A masonry wall according to claim 5, further comprising a plurality of connectors, each of said connectors being attached to said reinforcement means adjacent one of the exterior surfaces of said wall, said reinforcement means adjacent to the other exterior surface of said wall, and at least one of said elements.

9. A masonry wall according to claim 1, wherein said reinforcement means includes a pair of plates, one of said plates abutting one of two opposite exterior surfaces of said wall and the other of said plates abutting the other of said two opposite exterior surfaces of said wall.

10. A masonry wall according to claim 9, wherein said plates are made of steel.

11. A masonry wall according to claim 9, wherein each of at least some of said elements includes a plurality of recesses formed in at least one of the exterior surfaces thereof which abut one of said plates, at least one of said recesses being substantially parallel to the rows formed by said elements and at least one of said recesses being substantially parallel to the columns formed by said elements.

12. A masonry wall according to claim 1, further comprising a plurality of recesses formed in at least some of said elements, some of said recesses being substantially parallel to the rows formed by said elements and some of said recesses being substantially parallel to the columns formed by said elements, said recesses defining said predetermined portions of said wall.

13. A masonry wall according to claim 12, wherein said elements are generally block-shaped.

14. A masonry wall according to claim 13, wherein said recesses are formed in the edges of said at least some of said elements.

15. A masonry wall according to claim 14, wherein each of said recesses which are substantially parallel to the rows formed by said elements is adjacent to another of said recesses which are substantially parallel to said rows.

16. A masonry wall according to claim 14, wherein each of said recesses which are substantially parallel to the columns formed by said elements is adjacent to another of said recesses which are substantially parallel to said columns.

17. A masonry wall according to claim 13, wherein said recesses are formed between the edges of said at least some of said elements.

18. A masonry wall according to claim 1, wherein said reinforcement means includes fishplates extending outwardly from at least some of said elements, each of said fishplates being releasably attached to another of said fishplates which extends outwardly from a different one of said at least some of said elements to form a plurality of pairs of attached fishplates.

19. A masonry wall according to claim 18, wherein said fishplates extend outwardly from said at least some of said elements substantially parallel to the rows formed by said elements.

20. A masonry wall according to claim 19, wherein the fishplates of each of said pairs of attached fishplates are in abutting relationship one on top of the other.

21. A masonry wall according to claim 20, wherein each of said pairs of attached fishplates is spaced from a plane substantially parallel to the columns formed by said elements a distance which is different from the distance that each of the other of said pairs of attached fishplates is spaced from said plane.

22. A masonry wall according to claim 18, wherein one exterior surface of said wall is relatively inaccessible, said fishplates extending outwardly from said one exterior surface of said wall.

23. A masonry wall according to claim 18, wherein one exterior surface of said wall is relatively accessible and the other exterior surface of said wall is relatively inaccessible, said one exterior surface including recesses formed therein substantially parallel to the rows formed by said elements, said fishplates extending outwardly from said other exterior surface of said wall.

24. A masonry wall according to claim 1, wherein said reinforcement means includes a plurality of members disposed within at least some of said elements, said members being substantially adjacent to at least one of the exterior surfaces of said wall.

25. A masonry wall according to claim 24, wherein at least some of said members are generally parallel to the rows formed by said elements.

26. A masonry wall according to claim 24, wherein at least some of said members are generally parallel to the columns formed by said elements.

27. A masonry wall according to claim 24, wherein each of said at least some of said elements includes at least one recess formed in an exterior surface thereof and extending thereinto to a depth sufficient to expose said members.

28. A masonry wall according to claim 27, wherein each of the recesses is filled with an easily removable material.

29. A masonry wall according to claim 28, wherein said material is lean concrete.

30. A masonry wall according to claim 27, further comprising a plurality of connectors, each of said connectors being attached to at least one of said members which is adjacent to one of the exterior surfaces of said wall and to at least one of said elements.

31. A masonry wall according to claim 24, wherein said members are disposed in at least some of said elements, said members being substantially adjacent to both exterior surfaces of said wall.

32. A masonry wall according to claim 31, further comprising a plurality of connectors, each of said connectors being connected to at least one of said members which are adjacent to one of said exterior surfaces of said wall and to at least one of said members which are adjacent to the other exterior surface of said wall.

33. A masonry wall according to claim 32, wherein each of said connectors is attached to at least one of said elements.

34. A masonry wall according to claim 24, wherein said members are made of steel.

35. A masonry wall according to claim 1, wherein said elements are made of concrete.

36. A masonry wall according to claim 1, wherein said elements are prefabricated.

37. A masonry wall according to claim 1, wherein said elements are coated with a material which inhibits the adhesion of said elements to each other.

* * * * *

UNITED STATES PATENT AND TRADEMARK OFFICE
CERTIFICATE OF CORRECTION

PATENT NO. : 4,180,951
DATED : January 1, 1980
INVENTOR(S) : Willi Francioni

It is certified that error appears in the above-identified patent and that said Letters Patent are hereby corrected as shown below:

Column 1, line 36 the word "pair" should read --part--.

Column 3, line 61 the word "coast" should read --cost--.

Signed and Sealed this

*Twenty-fifth* Day of *March 1980*

[SEAL]

*Attest:*

SIDNEY A. DIAMOND

*Attesting Officer*  *Commissioner of Patents and Trademarks*